United States Patent [19]

Sonta et al.

[11] Patent Number: 4,931,262
[45] Date of Patent: Jun. 5, 1990

[54] METHOD OF TREATING H₂S CONTAINING GASES

[75] Inventors: Hiromi Sonta; Toshikazu Shiratori, both of Akita, Japan

[73] Assignee: Dowa Mining Co., Ltd., Tokyo, Japan

[21] Appl. No.: 283,005

[22] Filed: Dec. 8, 1988

Related U.S. Application Data

[63] Continuation of Ser. No. 20,757, Mar. 2, 1987, abandoned.

[51] Int. Cl.$^5$ .................. C01B 17/16; C01B 31/20; C12P 3/00; C12W 9/64
[52] U.S. Cl. .................................. 423/220; 423/224; 423/231; 423/573.1; 435/168; 435/264; 435/266; 435/282
[58] Field of Search .......... 423/DIG. 17, 224, 573 R, 423/231, 220; 435/266, 264, 168, 282

[56] References Cited

U.S. PATENT DOCUMENTS

| 3,972,965 | 8/1976 | Higgins | 261/91 |
|---|---|---|---|
| 4,011,304 | 3/1977 | Mancini et al. | 423/224 |
| 4,139,455 | 2/1979 | Yabuuchi et al. | 210/7 |
| 4,242,448 | 12/1980 | Brown, III | 423/DIG. 17 |
| 4,278,646 | 7/1981 | Lynn et al. | 423/224 |
| 4,758,417 | 7/1988 | van Lookeren-Campagne | 423/168 |

FOREIGN PATENT DOCUMENTS

| 0220776 | 5/1987 | European Pat. Off. |
| 2742199 | 4/1978 | Fed. Rep. of Germany ... 423/DIG. 17 |
| 2367704 | 5/1978 | France . |
| 58-152488 | 9/1983 | Japan . |
| 152488 | 9/1983 | Japan . |
| 21691 | 3/1984 | Japan . |
| 21721 | 1/1986 | Japan . |

OTHER PUBLICATIONS

Magota et al., "Treatment of Waste Gas Containing Cyanides and Sulfur Compounds from Chemical Plants", Chemical Abstract, vol. 105: 231753a, 1986.
Bailey et al., "Biochemical Engineering Fundamentals", 2nd Ed., McGraw Hill Book Company, 1986.
Mattiasson, Bo, "Immobilized Cells and Organelles", vol. 1, Chapter 2 (CRC Press, Inc., Boca Raton, Florida).
Patent Abstracts of Japan, vol. 7, No. 273 (C-198) [1418], 6th Dec., 1983; and JP-A-58 152 488(Sumitomo Jukikai Envirotech K.K.) 10-09-1983.
Chemie Ingenieur Technik, vol. 56, No. 8, Aug. 1984, pp. 599-609, Verlag Chemie GmbH, Weinheim, DE; C. OEHME: "Trägerbiologien in der Abwassertechnik".

Primary Examiner—Gregory A. Heller
Attorney, Agent, or Firm—Frishauf, Holtz, Goodman & Woodward

[57] ABSTRACT

There is disclosed an improved method for the purification of H₂S containing gases, which comprises the steps of (1) oxidizing a solution of ferrous sulfate into a solution of ferric sulfate with the aid of an iron-oxidizing bacterium; (2) absorbing the H₂S in the gas by the solution of ferric sulfate by bringing the gas into contact with the solution; (3) separating and recovering the elemental sulfur produced in the solution during the second step; and (4) returning the solution of ferrous sulfate, which is obtained in the third step in an elemental sulfur free state, to the first step to be oxidized again into a solution of ferric sulfate, said method being characterized in that the oxidation in the first step is carried out in a fixed-bed type oxidation vessel which is filled with a bacterium support onto which an iron-oxidizing bacterium has been deposited.

6 Claims, 5 Drawing Sheets

METHOD OF TREATING H₂S CONTAINING GASES

This application is a continuation of application Ser. No. 07/020,757, filed Mar. 2, 1987 now abandoned.

BACKGROUND OF THE INVENTION

The present invention relates to a method of treating H$_2$S containing gases. More particularly, the present invention relates to an improved method that can be implemented with a very compact equipment layout in performing the following process: an iron-oxidizing bacterium is allowed to grow in a fixed-bed type oxidation vessel so as to convert a solution of ferrous sulfate to a solution of ferric sulfate; H$_2$S in the gas to be treated is absorbed by the solution of ferric sulfate; the solution of ferrous sulfate that forms as a result of H$_2$S absorption is again oxidized with the iron-oxidizing bacterium to form another supply of a solution of ferric sulfate which is repeatedly used in absorbing H$_2$S in the gas being treated; and the sulfur content of the solution of ferric sulfate used as the H$_2$S absorbing liquor is fixed and recovered in the form of elemental sulfur ($S^0$).

Bacterial oxidation of ferrous sulfate containing solutions has been accomplished for many years by such classical methods as the trickling filter process and the rotary disk process. In order to improve the efficiency of oxidation, methods are commercially used in which a dense population of iron-oxidizing bacteria that are adhered to iron precipitates or diatomaceous earth is retained in the oxidation vessel. See, for example, the disclosure in Japanese Patent Publication No. 38981/1972 entitled "Method of Continuous Oxidation of Fe$^{2+}$ in Mine Water with Iron Oxides Containing an Iron-Oxidizing Bacterium" and U.S. Pat. No. 4,139,456, "Process for Oxidation Treatment of Fe$^{2+}$ in wastewater", both having been filed an patented by the applicant of subject application.

Methods are also known to treat H$_2$S in gases with the solution of ferric sulfate produced by oxidation with iron-oxidizing bacteria, and they are disclosed in Japanese Patent Publication No. 21691/1986, "Method of Treating H$_2$S in Gases", and Japanese Patent Public Disclosure No. 21721/1986, "Method of Treating H$_2$S in gases", both having been also filed by the applicant of subject application.

The aforementioned conventional methods, in which iron-oxidizing bacteria are deposited on diatomaceous earth or other particulate matters that are suspended in solutions in the oxidation vessel, have the following disadvantages.

(1) A large-scale oxidation and a separation vessel (i.e., thickener) are necessary and this leads to the need to provide a very large installation area.

(2) The need to blow a large volume of air into the oxidation vessel leads to great power consumption.

The first problem is particularly serious in Japan where large quantities of H$_2$S have to be treated at oil refineries and other plants.

SUMMARY OF THE INVENTION

The present invention has been accomplished in order to solve the aforementioned problems of the prior art and it provides a new method for achieving efficient treatment of H$_2$S containing gases with a smaller apparatus that employs a fixed bed type oxidizing vessel wherein an oxidation vessel and a separation vessel are combined into a unitary system.

The present invention offers an improved method of treating a H$_2$S containing gas by absorbing H$_2$S with the solution of ferric sulfate that is produced by oxidation with an iron-containing bacterium. This method comprises: the first step of oxidizing a solution of ferrous sulfate into a solution of ferric sulfate in an oxidation vessel which is filled with a bacterium support onto which an iron-oxidizing bacterium has been deposited and which is present in the interior of said oxidation vessel in a stationary state; the second step of absorbing the H$_2$S in the gas to be treated, with the solution of ferric sulfate being used as an absorbing liquor; the third step of separating and recovering the elemental sulfur produced in the absorbing liquor in the second step; and fourth step of returning into the oxidation vessel the solution of ferrous sulfate that has been formed in the third step and which is free of elemental sulfur.

The bacterium support with which the oxidation vessel is filled may be selected from a variety of acid-resistant materials onto which the iron-oxidizing bacterium can be deposited, such as glass-wool, zeolite, bentonite, alumina, pumice stone and plastics.

Various industrial wastewaters such as those discharged from non-ferrous metal mines, from refining plants and from other plants in general may be fed into the oxidation step as the ferrous sulfate containing solution. Such wastewaters can be satisfactorily oxidized with iron-oxidizing bacteria if their Fe$^{2+}$ concentrations are within the range and about 1–50 g/L. The pH of the feed solution is determined such that it will produce no precipitate while attaining a satisfactory efficiency of oxidation in the reactor, i.e., oxidation vessel. Better results can be attained if the pH of the feed solution is lowered to 1.8 or less by preliminary treatment. If the feed solution is the wastewater from a refining plant or other wastewater that do not contain any iron-oxidizing bacteria or nutrient sources therefor, nutrients such as nitrogen, phosphorus and potassium salts are preferably added to the feed solution so as to ensure active bacterial growth.

The bacterium used in the present invention is selected from known iron-oxidizing bacteria such as *Thiobacillus ferroxidans* that may be prepared by the following procedure: a seed iron-oxidizing bacterium in slime in wastewater is cultivated in a solution that contains ferrous ions in a high concentration (ca 30 g/L) and colonies having a high oxidation capability are selected from the culture. The so separated bacteria have an oxidation capability that ranges from 2 to 5 times the abilities of wild iron-oxidizing bacteria present in the slime of wastewaters and some of them have been deposited with the Fermentation Research Institute, the Agency of Industrial Science and Technology under Assession Numbers FERM 7443, 7444, 7555 and 7556.

DETAILED DESCRIPTION OF THE INVENTION

The treating method of the present invention is hereunder described with reference to the following examples that should be read in conjunction with the accompanying drawings.

EXAMPLE 1

Figure 1:
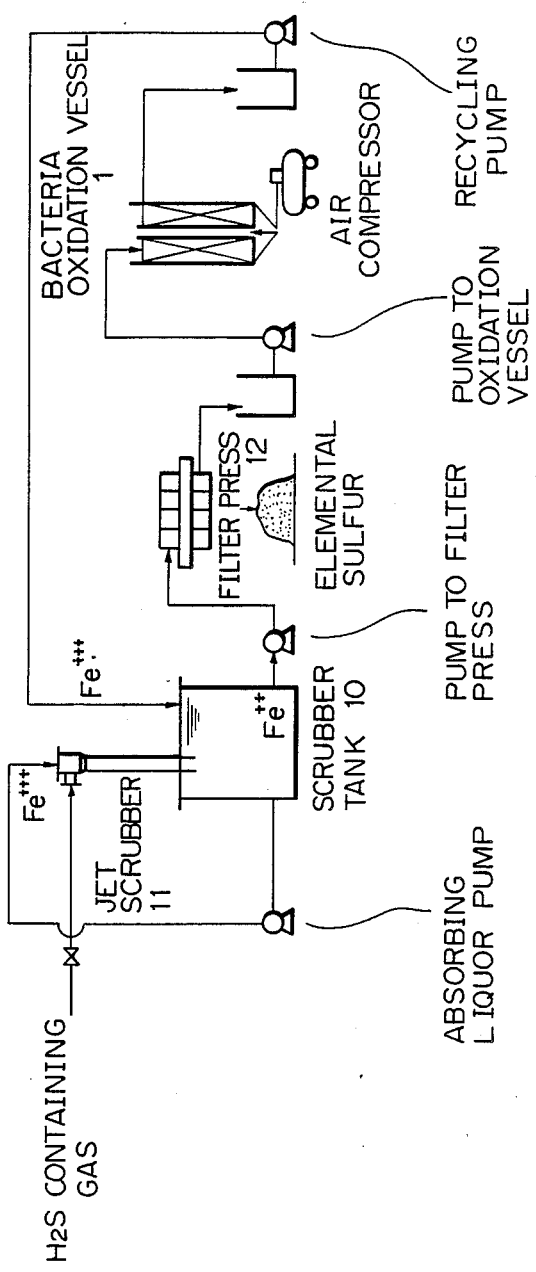
FIG. 1 is a flowsheet of the method of the present invention.
Figure 2:
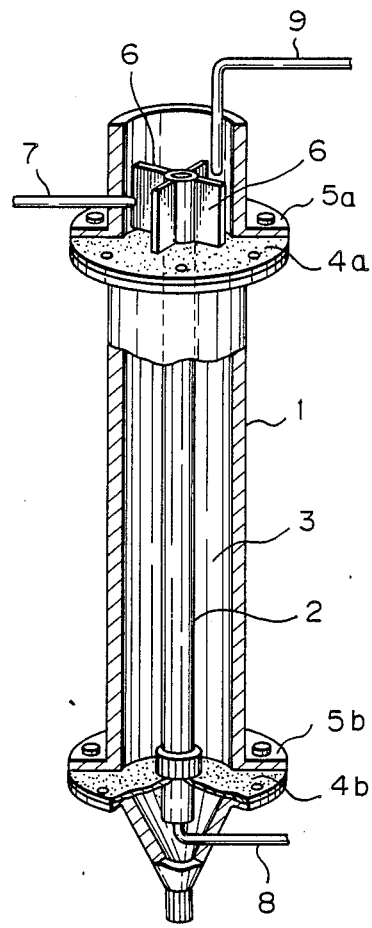
FIG. 2 is a schematic drawing of an oxidation vessel that is preferably used to implement the method of the present invention.

A flowsheet of the method of the present invention is depicted in FIG. 1. A bacterial oxidation vessel 1 wherein a solution of ferrous sulfate is oxidized to a solution of ferric sulfate is shown enlarged in FIG. 2. The oxidation vessel 1 contains in its interior a smaller vessel 3 that is filled with glass-wool (not shown) serving as a bacterium support. The vessel 3 is defined by porous state 4a and 4b that are horizontally fixed on top and bottom of the vessel 1 with flanges 5a and 5b, respectively.

An air-lift pipe 2 that is open at both ends is fixedly supported in the axial direction of the vessel 1 and penetrates through the porous plates 4a and 4b. That portion of the air-lift pipe which projects beyond the porous plate 4a is equipped with a plurality of liquid separating plates 6 that extend radially toward the inside wall of the oxidizing vessel 1. These plates divide the space above the porous plate 4a into a plurality of compartments (four in FIG. 2). A pipe 9 through which a ferrous sulfate containing solution is supplied as the feed solution is inserted from above into one of the compartments defined by the plates 6. Other one of the compartments is provided with an overflow pipe 7 communicating with the outside of the vessel 1. A compressed air blowing pipe 8 is inserted into the bottom end of the air-lift pipe 2 and the other end of this pipe 8 is connected to an external air compressor.

The method of the present invention will proceed as follows. The feed liquor is permitted to flow into one of the compartments defined by the separator plates and the flow rate of the liquor, which is determined in consideration of the air-lift action, is controlled such that the liquid level in the vessel 1 is substantially equal to the height of the overflow pipe 7. When compressed air is blown into the air-lift pipe 2 from its bottom, a diffuser plate (not shown) positioned within the lower end of the pipe 2 produces tiny air bubbles, which rise through the pipe 2 together with the feed liquor that is being sucked from the bottom of the pipe 2. The liquor flowing out of the top end of the air-lift pipe 2 is distributed by the separator plates 6 and part of it is discharged out of the system through the overflow pipe 7 while the remaining majority of the liquor goes down through the vessel 3 and is recharged into the air-lift pipe together with compressed air. As it is circulated through the system in this manner, the feed solution is subjected to repeated cycles of oxidation.

In Example 1, an experiment of oxidative treatment was conducted with a system including an oxidation vessel 1 that had an inside diameter of 110 mm and an effective liquid level of 400 mm, and a vessel 3 that was filled with a total of 70 g/L of glass-wool on which an iron-oxidizing bacterium was deposited. The reactor 1 was fed with 20 ml/min of a solution containing 10 g/L of $Fe^{2+}$ while it was bubbled with air at a rate of 0.6 $Nm^3/min/m^2$. With the feed solution being circulated in the manner described above, an oxidation treatment was carried out continuously for a period of 3 days.

The liquor being discharged through the overflow pipe 7 containing 0.1 g/L of $Fe^{2+}$ and this indicated that the feed solution had been thoroughly oxidized.

Glass-wool used as the bacterium support may be replaced by zeolite, bentonite, alumina, pumice stone, plastics, PVC Raschig ring and Pole ring, and the present inventors confirmed that equally good results are obtained with these support materials.

The oxidation vessel 1 used in Example 1 was of the air-lift type but any other types of oxidation vessel may be employed to achieve equally good results so long as they are of the fixed bed type. As an example, a simple bacterium-packed case that is filled with a bacterium support and which is closed at either end with a metal screen or a porous plate may be operated in such a manner that a solution of ferrous sulfate is caused to flow downward while air is supplied from the bottom upward.

The solution of ferric sulfate obtained in the oxidation vessel 1 was then forced into a scrubber tank 10 with a recycling pump. The solution was further sent to a jet scrubber 11 with an associated pump and in the scrubber the solution was brought into contact with a $H_2S$ containing gas so as to absorb the $H_2S$ in that gas. At the same time, elemental sulfur formed as a result of the following reaction:

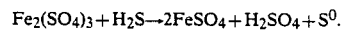

$$Fe_2(SO_4)_3 + H_2S \rightarrow 2FeSO_4 + H_2SO_4 + S^0.$$

In Example 1, a $H_2S$ containing gas was treated with the liquor for rate and $H_2S$ concentration being varied as shown in FIG. 1. Measurement of the $H_2S$ concentration in the product gas with a Kitagawa detector tube showed that the method of the present invention had achieved 98.8% desulfurization or higher.

TABLE 1

| Liquor flow rate (L/hr) | Gas flow rate ($m^3$/hr) | $H_2S$ concentration | | Percent $H_2S$ absorption |
|---|---|---|---|---|
| | | feed | product | |
| 3000 | 6 | 6,200 | 75 | 98.8 |
| 3000 | 5 | 5,500 | 49 | 99.1 |
| 3000 | 3.2 | 6,200 | 13 | 99.8 |

The solution of ferrous sulfate containing the elemental sulfur ($S^0$) that was formed as a result of $H_2S$ absorption was withdrawn from the bottom of the scrubber tank 10 and sent to a filter press with a pump so as to separate the elemental sulfur from the solution of ferrous sulfate.

The sulfur-free solution of ferrous sulfate was returned to the oxidation vessel 1 where it was oxidized to form a solution of ferric sulfate. The resulting solution of ferric sulfate was again sent to the scrubber tank 10 for another use in the absorption of $H_2S$.

The elemental sulfur which forms during the practice of the method of the present invention may be recovered by any method that suits a specific purpose of sulfur recovery. Two exemplary methods are: (1) separation and recovery with a filter press; and (2) flocculation and precipitation in a separating vessel.

EXAMPLE 2

Figure 6:
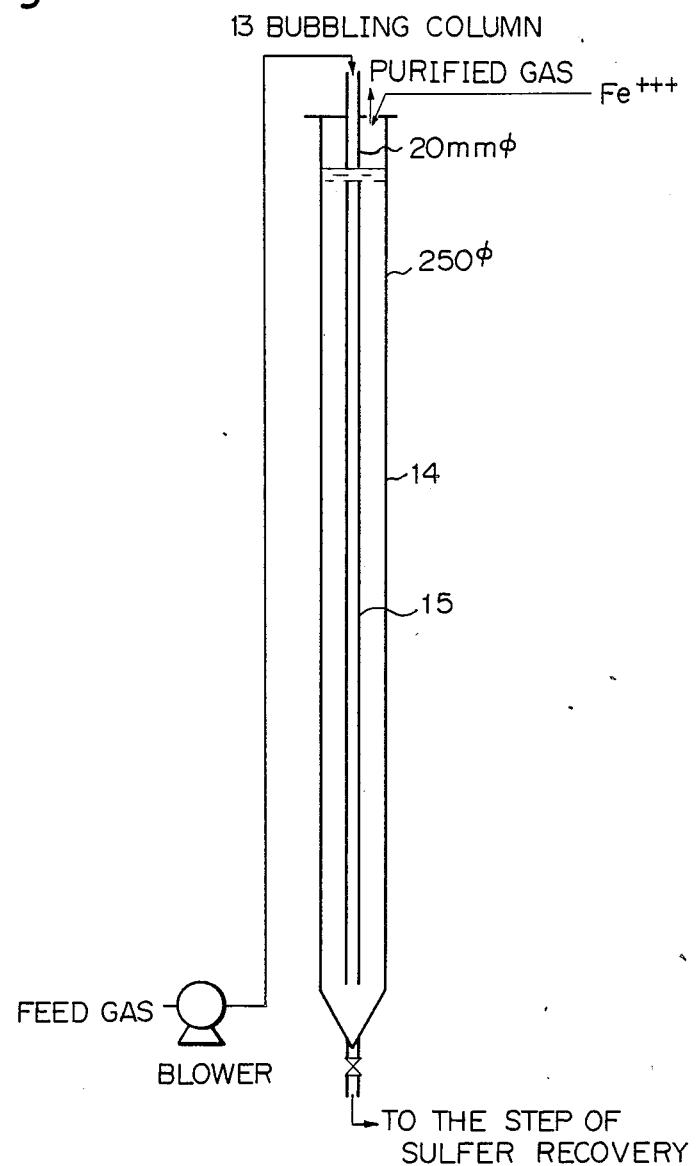
FIG. 6 is a schematic diagram showing the construction of an air bubble tower that may be preferably used as a $H_2S$ absorber in the practice of the method of the present invention.

A $H_2S$ containing gas having the $H_2S$ concentrations shown in Table 2 was treated, with the gas flow rate and the liquid depth in a bubbling column (i.e., the distance from the level of the stationary absorbing liquor to the gas blowing inlet) being varied in order to investigate the relationship between the liquid depth and the efficiency of desulfurization. Oxidation and recovery of elemental sulfur were conducted in the same manner as in Example 1. The bubbling column used in place of the jet scrubber in the absorption step had the construction shown in FIG. 6. This bubbling column indicated at 13 in FIG. 6 consisted of an outer cylinder 14 (250 mm$\phi$) and a centrally positioned inner cylinder 15 (20 mm$\phi$). The bottom of the column was conically shaped to allow the product elemental sulfur to be extracted from the bottom. The results of the treatment conducted in Example 2 are shown in Table 2, from which one can see that the liquid depth of at least 5 m was sufficient to achieve 98% desulfurization or more as in Example 1.

TABLE 2

| | Gas flow rate | | | | | | | | |
|---|---|---|---|---|---|---|---|---|---|
| | 70 L/min | | | 90 L/min | | | 130 L/min | | |
| Liquid depth | $H_2S$ concentration (ppm) | | $H_2S$ absorption (%) | $H_2S$ concentration (ppm) | | $H_2S$ absorption (%) | $H_2S$ concentration (ppm) | | $H_2S$ absorption (%) |
| | entrance | exit | | entrance | exit | | entrance | exit | |
| 3 m | 140 | 8 | 94.3 | 125 | 8 | 93.6 | 125 | 9 | 92.8 |
| 5 m | 175 | 1 | 99.4 | 175 | 2 | 98.9 | 155 | 3 | 98.1 |
| 7 m | 180 | 0 | 100.0 | 140 | 0 | 100.0 | 175 | 0 | 100.0 |

Reference Example 1

Figure 3:
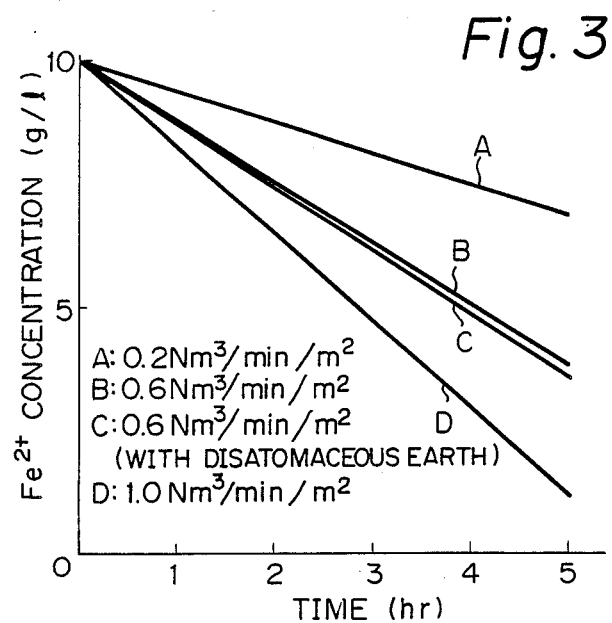
FIG. 3 is a graph showing the profile of oxidation rate versus the volume of air blown into the oxidation vessel.

A batch operation was performed with the system used in Examples 1 and 2 in order to investigate the change in oxidation rate as a function of the amount of air blown. The results are depicted in FIG. 3. Air was blown at rates of 0.2, 0.6 and 1.0 $Nm^3$/min per square meter of a cross section of the reactor (oxidation vessel). A treatment was also conducted by the conventional method with 0.6 $Nm^3/min/m^2$ of air being blown into the oxidation vessel filled with about 50 g/L of diatomaceous earth. As one can see from the data shown in FIG. 3, the efficiency of oxidation attained in Reference Example 1 was comparable to that achieved in Examples 1 and 2 wherein the oxidation vessel filled with 70 g/L of glass-wool was bubbled with 0.6 $Nm^3/min/m^2$ of air.

Reference Example 2

Figure 4:
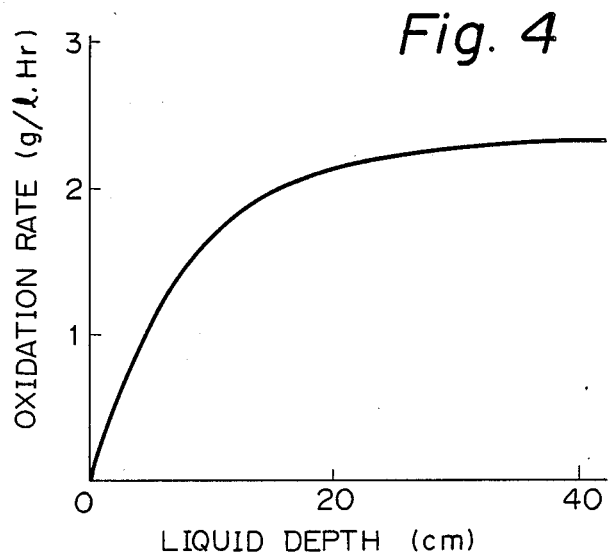
FIG. 4 is a graph showing the profile of oxidation rate versus the position from which air is blown into an air-lift pipe.

An experiment was conducted in order to investigate the change in oxidation rate as a function of the position from which air was blown into the air-lift pipe. The amount of air blown into the oxidation vessel was held constant at 0.6 $Nm^3/min/m^2$. The results are shown in FIG. 4, from which one can see that substantially equal results were obtained whether air was blown into the air-lift pipe from a middle portion thereof or from the bottom. This may be probably because the rate of oxidation would not be greatly affected so long as air is held in contact with the liquid for a sufficient period of time of ensure saturation of the liquid with air.

It may safely be concluded that in performing the method of the present invention, air need not be blown into the air-lift pipe from its bottom and may be blown from a middle portion of the pipe. By doing this, one can reduce the power consumption when operating with large equipment.

Reference Example 3

Figure 5:
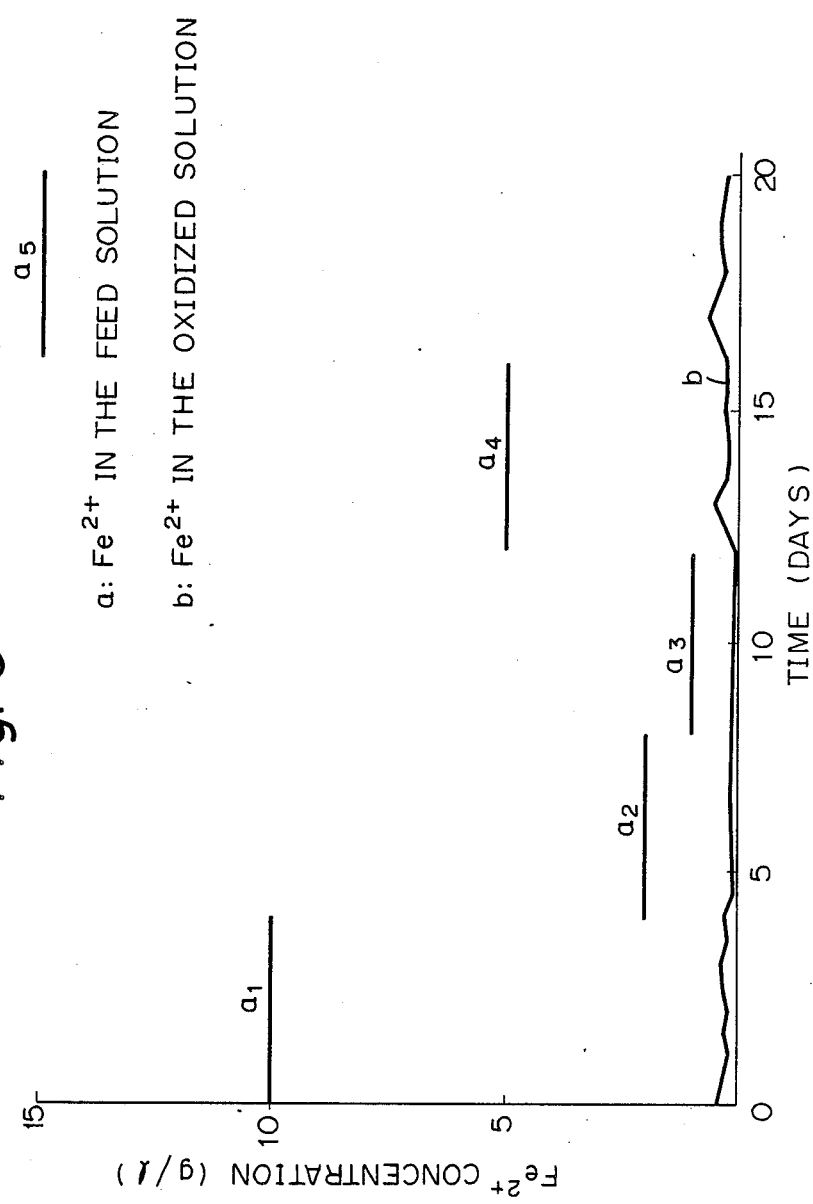
FIG. 5 is a graph showing the profile of $Fe^{2+}$ concentrations in an liquor that was continuously oxidized with the concentration of the feed liquor set to various values.

A continuous treatment was carried out with 0.6 $Nm^3/min/m^2$ of air being blown from the bottom of the air-lift pipe while a feed solution was supplied into the reactor at varying $Fe^{2+}$ concentrations of 1, 2, 5, 10 and 15 g/L. The results are shown in FIG. 5, from which one can see that the iron-oxidizing bacterium worked well at all of the $Fe^{2+}$ concentrations employed to achieve satisfactory levels of oxidation efficiency.

To summarize the advantages of the method of the present invention, it eliminates the use of the conventional types of oxidation vessel and separation vessel (thickener) and, hence, can be operated with a compact system, which affords a great economic advantage in terms of plant installation.

We claim:
1. A method of treating $H_2S$ containing gas to remove the $H_2S$ by absorbing it into a solution of ferric sulfate prepared by oxidizing a ferrous sulfate solution with iron oxidizing bacteria, comprising the steps of
   loosely containing a bacteria support supporting the iron-oxidizing bacteria in an oxidation vessel between upper and lower spaced apart porous plates which are horizontally fixed across the vessel so that the vessel is partitioned and the bacteria support with the bacteria is loosely fixed therebetween in the interior of the oxidation vessel; said bacteria support being a member selected from the group consisting of glass-wool, zeolite, bentonite, alumina, pumice stone, PVC raschig rings and Pole rings;
   oxidizing the ferrous sulfate solution with the bacteria by supplying the ferrous sulfate solution through the upper porous plate into the interior of the oxidation vessel where the bacteria are supported; and, thereafter oxidizing the ferrous sulfate to ferric sulfate by action of bacteria,
   removing the ferric sulfate solution from the oxidation vessel by providing an air-lift pipe having top and bottom ends which are both open, said air-lift pipe being fixedly supported in the oxidation vessel and penetrating through the porous plates whereby the upper end extends above the upper porous plate and the bottom end extends below the bottom porous plate into a lower portion of said oxidation vessel; and supplying an air stream into the bottom of the air-lift pipe to carry the ferric sulfate solution up the air-lift pipe and out of the upper end; thereafter collecting ferric sulfate solution and treating the H$_2$S containing gas therewith to remove the H$_2$S from the gas and reduce the ferric sulfate in the solution to ferrous sulfate and elemental sulfur;

separating and recovering the elemental sulfur; and returning the ferrous sulfate solution to the oxidation vessel, to be oxidized to ferric sulfate by the bacteria.

2. The method of claim 2 wherein part of said ferric sulfate solution flowing out of the top end of the air-lift pipe is transferred to the H$_2$S-absorbing step while the majority of the remaining ferric sulfate solution goes down through the oxidation vessel and is recharged into the air-lift pipe, so that a portion of the ferric sulfate solution is subjected to repeated cycles of oxidation by the bacteria.

3. The method of claim 1 wherein said fixed support is zeolite, bentonite, alumina or pumice stone.

4. The method of claim 1 wherein said fixed support is glass wool.

5. The method of claim 1 wherein said fixed support is glass-wool, PVC raschig rings or Pole rings.

6. The method of claim 1 wherein the ferrous sulfate solution is passed repeatedly through the fixed support for repeated oxidation by the bacteria.

* * * * *